No. 868,379. PATENTED OCT. 15, 1907.
E. WEINTRAUB.
SYSTEM OF ELECTRICAL DISTRIBUTION.
APPLICATION FILED JULY 23, 1903. RENEWED OCT. 30, 1905.
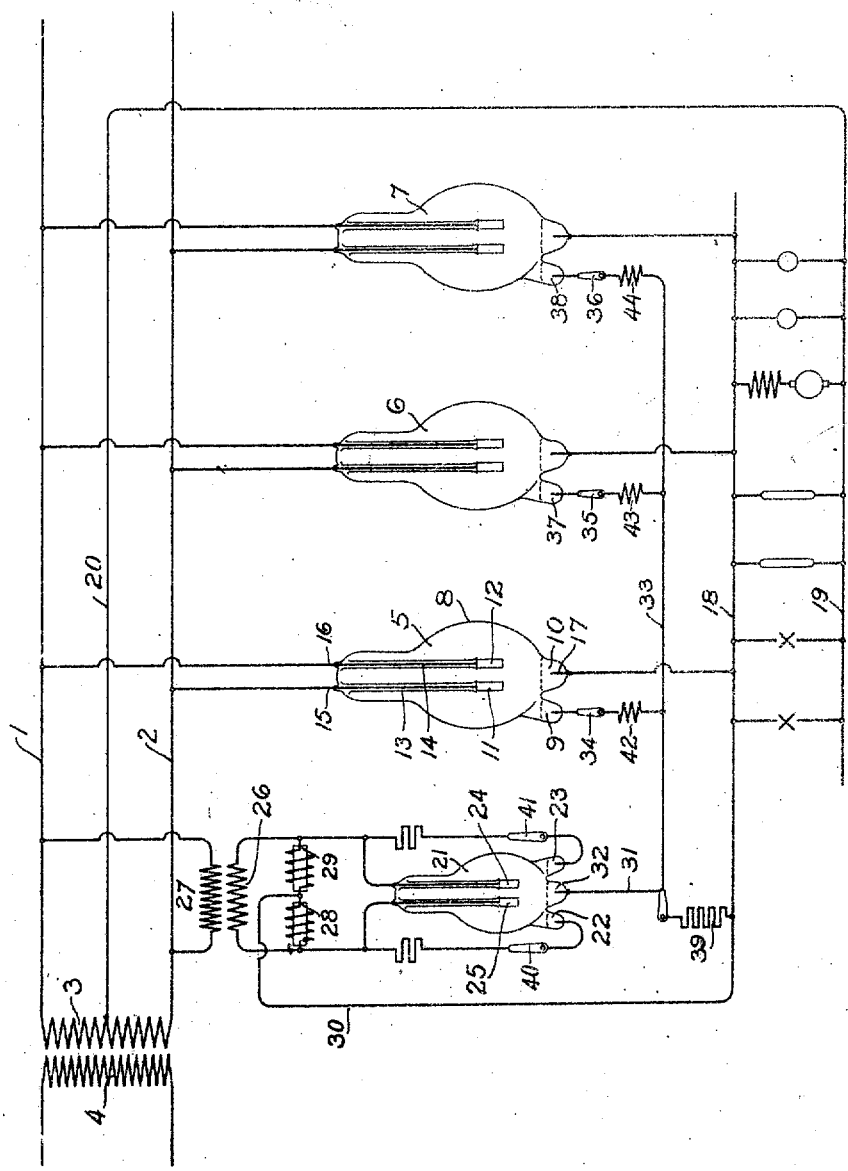
Witnesses:
George A. Thornton,
Helen Orford
Inventor:
Ezechiel Weintraub,
by Albert G. Davis
Att'y.

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

No. 868,379.      Specification of Letters Patent.      Patented Oct. 15, 1907.

Application filed July 23, 1903, Serial No. 166,656. Renewed October 30, 1905. Serial No. 285,005.

*To all whom it may concern:*

Be it known that I, EZECHIEL WEINTRAUB, a subject of the Czar of Russia, residing at Schenectady, county of Schenectady, State of New York, have invented certain new and useful Improvements in Systems of Electrical Distribution, of which the following is a specification.

My present invention relates to an organization embodying alternating current vapor conductors such as rectifiers, lamps or the like. Certain forms of such rectifiers or lamps require for continuous operation to have maintained in the receptacle or envelop of the respective rectifier or lamp a supplemental arc or, as I may term it, a side branch, fed with current from some suitable source. The amount of current used in such side branch may be very small so that I therefore find it convenient in many instances to use rectifiers or lamps of this type, in which case the side branches or supplemental arcs of the vapor conductors are, in accordance with my invention, all fed from a single source of current which as set forth in this application may be a rectifier, relatively small in size, supplied from the same source which feeds the main rectifiers or lamps.

My invention embodies various features of novelty as pointed out with particularity in the appended claims. The invention itself, however, both as to its embodiment in practice and its mode of operation, will be better understood by reference to the following specification taken in connection with the accompanying drawings which are illustrative of one of the various forms which my invention may assume.

In the drawings the main source of alternating current supply is conventionally represented by the alternating-current mains 1 and 2 fed from the secondary 3 of a transformer, the primary 4 of which communicate with the generating end of the system. As illustrative of vapor conductors operated in accordance with my invention I have represented a plurality of vapor rectifiers at 5, 6 and 7. Each rectifier consists of a highly exhausted envelop or receptacle such as at 8, provided at its bottom portion with pockets containing bodies of mercury 9 and 10. The body of mercury 10 constitutes one of the main electrodes of the rectifier while the body of mercury 9 is a supplemental electrode between which and the electrode or cathode 10 a sustaining arc is maintained for a purpose to be described. Within the enlarged portion of the envelop 8, two other electrodes 11 and 12 are located and are held in position by means of glass-incased depending iron wires or rods 13 and 14 with leading-in conductors 15 and 16 extending through the walls of the envelop. These leading-in conductors are connected across the mains 1 and 2. The cathode 10 is connected through a corresponding leading-in conductor 17 to one main 18 of a consumption circuit the other main 19 of which is connected to a neutral conductor 20 extending from the central or similar intermediate point of the secondary 3. The other rectifiers 6 and 7 as shown are of a construction substantially identical with that of the rectifier 5 and the connections are the same so that no additional description thereof is necessary.

At the left hand side of the drawing a small self-operating rectifier is indicated at 21. This rectifier has an envelop of a construction similar to that of the rectifier 5 except, however, that it is provided with two supplemental electrodes 22 and 23 instead of one as in the case of the rectifier 5. The rectifier 21 has its upper or solid electrodes 24 and 25 connected to the secondary 26 of a transformer, the primary 27 of which may be fed from any source of alternating current, in this instance from the mains 1, 2. Two inductance coils 28 and 29 are connected in series across the leads of the secondary 26 and a conductor 30 extends from the junction between these inductance coils. This conductor 30, together with the conductor 31 extending from the main electrode or cathode 32 of the rectifier constitute the two leads of the direct current circuit of the rectifier.

This circuit is used to supply current for maintaining in each or any of the rectifiers 5, 6 and 7 a supplemental arc between the additional electrode and the main cathode. To this end a variety of connections may be made so as to supply the supplemental arcs of the rectifiers either in multiple, as shown in the drawings, or if desired the connections may be modified so as to supply the arcs in series. As shown in the drawings, however, the conductors 30 and 31 are represented as connected to the leads 18 and 33 of which the lead or main 18 is connected to the respective cathodes of the rectifiers 5, 6 and 7 and the lead 33, through switches 34, 35 and 36 with the respective supplemental electrodes 9, 37 and 38.

In order to start up the system the rectifier 21 is first started and for convenience may be started with its direct current circuit feeding a resistance 39. The starting of the rectifier is effected by shaking the receptacle or otherwise causing the mercury in one or the other of the starting electrodes 22 and 23 to flow over into contact with the cathode 32 and then separate. When the direction of flow of current in the starting arc is such that the electrode 32 is negative or in other words a cathode, the excitation thus produced on the cathode sets free ionized vapor and causes thereby an arc to start between the cathode and the other starting electrode. These arcs occur so as mutually to sustain each other and so keep up a continuous current discharge in the envelop. By opening the switches 40 and 41, the arcs desert the starting electrodes 22 and 23 and pass to the main electrodes or anodes 24 and 25, maintaining, however, their connection with the main cathode 32.

In the operation of these arcs the inductance coils 28 and 29 play the important part of storing energy during a current wave therethrough of one polarity and then restoring the energy so as to maintain the arc in the envelop when current normally would cease to flow from the source.

Let it be assumed that the rectifier 21 has been started and is passing current through the resistance 39, the presence of which affords the necessary closure for the direct current circuit of the rectifier and at the same time limits the current of the rectifier to an amount slightly in excess of that at which the rectifier would become unstable. If it be desired to start and operate any one of the rectifiers 5, 6 and 7, it is only necessary to close the corresponding switch, as for example in the case of the rectifier 5 the switch 34, and then shake the rectifier 5 so as to cause a momentary overflow of mercury between the two electrodes 9 and 10. As the mercury separates, the current flow produced by the engagement of the two bodies of mercury springs an arc which is of such direction, as to its current flow, that the electrode 10 is immediately excited as a cathode. The ionized vapor given off by the cathode then renders the interior of the envelop 5 conducting for waves of a given polarity, whereupon waves of current flow through arcs formed alternately from the anodes 11 and 12 to the cathode 10. Any one or all of the rectifiers may thus be started up and will continue in operation as long as the supplemental arc exists. When it is desired to discontinue the operation of a rectifier all that is necessary is to interrupt the circuit of the supplemental arc. Resistances 42, 43 and 44, either inductive or non-inductive, may be placed respectively in series with the supplemental or auxiliary arcs for the purpose of steadying them.

In the drawings I have represented the rectifiers 5, 6 and 7 as supplying a common load consisting of translating devices connected between the leads or mains 18 and 19, but it will be evident that each of the rectifiers, instead of supplying a common load may, of course, if desired, each supply its own load. Also it should be mentioned that, after the supplemental arcs in one or more of the rectifiers 5, 6 and 7 have been started, thus completing the direct current circuit of the rectifier 21, the resistance 39, being no longer required, may be omitted. If desired, however, the resistance may be kept permanently in circuit so that in the event of the arcs in the rectifiers 5, 6 and 7 going out the rectifier 21 will still be in running condition.

From the foregoing description it will be evident that various modifications may be made in the application of my invention without departing from the spirit thereof, for which reason I do not wish to be limited to the exact details shown and described.

I do not herein lay claim to the rectifier herein shown, nor to the broad idea of exciting a rectifier by direct current, nor to any other feature not specifically claimed herein.

What I do claim herein as new and desire to secure by Letters Patent of the United States, is, 1. The combination of one or more vapor electric devices of that type requiring a supply of current from a separate source to keep it or them in operation, and a rectifier for supplying the said current.

2. The combination of a single-phase alternating current system provided with a neutral conductor, a rectifier having two electrodes connected to mains of said system; and a third electrode connected to said neutral conductor, and an auxiliary rectifier supplied from said system and arranged to furnish current for maintaining an arc or discharge in the main rectifier.

3. The combination of a single-phase vapor rectifier provided with main electrodes and an additional electrode, and an auxiliary rectifier for maintaining an arc or discharge between said additional electrode and one of said main electrodes.

4. The combination of an alternating current supply system provided with a neutral conductor, one or more vapor rectifiers each having electrodes connected to the mains of said system and to said neutral conductor, and an auxiliary vapor rectifier for constantly exciting the first mentioned rectifier or rectifiers.

5. The combination of a vapor electric apparatus for utilizing alternating current, which apparatus is provided with main electrodes and an additional electrode, and a self operating vapor rectifier for maintaining an arc or current flow between said additional electrode and one of said main electrodes.

6. The combination of an alternating current system, a vapor electric device connected thereto, and means for producing a continuous auxiliary or supplemental arc in said device consisting of an auxiliary rectifier supplied with current inductively from said alternating current system.

7. The combination of a source of alternating current, a vapor electric apparatus comprising an exhausted envelop provided with electrodes, and a rectifying device connected to said source and arranged to produce a supplemental or auxiliary arc in said apparatus.

In witness whereof, I have hereunto set my hand this 18th day of July, 1903.

EZECHIEL WEINTRAUB.

Witnesses:
BENJAMIN B. HULL,
MARGARET E. WOOLLEY.